(12) United States Patent
Gentilhomme et al.

(10) Patent No.: US 11,017,341 B2
(45) Date of Patent: May 25, 2021

(54) WORKFLOW AS A SERVICE

(71) Applicant: Nintex USA, Inc., Bellevue, WA (US)

(72) Inventors: Alain Marie Patrice Gentilhomme, Sammamish, WA (US); Ryan Christopher Duguid, Sammamish, WA (US); Zoe Dee Clelland, Seattle, WA (US); Joshua Joo Hou Tan, Newport (AU); David Paul Fitzpatrick, Camberwell (AU)

(73) Assignee: Nintex UK Ltd., London (GB)

( * ) Notice: Subject to any disclaimer, the term of this patent is extended or adjusted under 35 U.S.C. 154(b) by 311 days.

(21) Appl. No.: 16/033,129

(22) Filed: Jul. 11, 2018

(65) Prior Publication Data
US 2019/0019130 A1   Jan. 17, 2019

Related U.S. Application Data

(60) Provisional application No. 62/531,770, filed on Jul. 12, 2017.

(51) Int. Cl.
*G06Q 10/00* (2012.01)
*G06Q 10/06* (2012.01)

(52) U.S. Cl.
CPC ... *G06Q 10/06316* (2013.01); *G06Q 10/0633* (2013.01)

(58) Field of Classification Search
USPC .............................................. 705/7.11–7.42
See application file for complete search history.

(56) References Cited

U.S. PATENT DOCUMENTS

| | | | |
|---|---|---|---|
| 2004/0187089 A1* | 9/2004 | Schulz ................... | G06Q 10/06 717/101 |
| 2009/0037241 A1* | 2/2009 | Olsen ............... | G06Q 10/06398 705/7.36 |
| 2009/0204467 A1* | 8/2009 | Rubio .............. | G06Q 10/06316 705/7.27 |
| 2013/0085798 A1* | 4/2013 | Spatola .................. | G16H 40/20 705/7.24 |
| 2014/0372965 A1* | 12/2014 | Alibakhsh ............... | G06F 19/00 717/101 |

* cited by examiner

*Primary Examiner* — Alan S Miller
*Assistant Examiner* — Mustafa Iqbal
(74) *Attorney, Agent, or Firm* — Newman Du Wors LLP

(57) ABSTRACT

Workflow sharing system and method are disclosed that allow a workflow server to provide a shared workflow, wherein the shared workflow generates at least one manifest, wherein the at least one manifest comprises a third-party interaction field, a credentials field, an input parameter field, and an output parameter field, wherein the workflow server receives a request for access to the shared workflow and transmits the at least one manifest of the shared workflow in response to the request for access to the shared workflow, wherein the at least one manifest comprises an acceptance requirement of the third-party interaction field, the credentials field, the input parameter field, and the output parameter field, wherein the workflow server receive consents of the acceptance requirement of the at least one manifest; and allows access to the shared workflow in response to the received consent of the acceptance requirement of the at least one manifest.

31 Claims, 12 Drawing Sheets

| EXPLORE | UPLOAD | MANAGE |

Workflows | Customers

Search

| Customer | Workflow |
|---|---|
| Acme ▲ | 4 |
| Creston ▲ | 1 |
| Gerber ▶ | 3 |

| Workflow | Type | Usage | Revenue | Renewal | Contact |
|---|---|---|---|---|---|
| | | | | | Manage |
| ▲ | | | | | ▲ |

WORKFLOW AS A SERVICE

CROSS-REFERENCE TO RELATED APPLICATIONS

This application claims benefit to U.S. Provisional Application No. 62/531,770, filed on Jul. 12, 2017, entitled "WORKFLOW AS A SERVICE", the contents of all of which are incorporated herein by this reference as though set forth in their entirety, and to which priority and benefit are claimed.

TECHNICAL FIELD

The present disclosure relates generally to the field of workflow as a service (WaaS™) and customized workflow processes, and more particularly, to systems, methods, and articles used to create workflow as a service in a cloud-computing environment. In embodiments, the WaaS environment utilizes a manifest that contains properties regarding the workflow, including configuration details and information accessed or required by the workflow.

BACKGROUND INFORMATION

Workflows are applications that streamline and automate a wide variety of business processes, such as collecting signatures, gathering feedback, requesting approvals for a plan or document, or tracking the current status of a business procedure. Workflows can be created on low-code development platforms. Workflows enable a user or customer to automate many business processes in a way that dramatically enhances productivity and efficiency. The workflow industry is constantly seeking improvements in the quality, performance, and power of workflows that a customer may use.

One drawback of existing workflow architectures is that they generally require that customers operate in islands of productivity. Although the workflow creation experience enables the reuse of component components to perform routine discreet tasks, more advanced tasks are generally created anew each time by each customer. Existing workflow technologies have long felt a need for improved collaboration and ease of development, yet such goals have eluded those skilled in the art, until now.

SUMMARY OF THE DISCLOSURE

The present disclosure is directed as systems and methods for providing workflow as a service.

BRIEF DESCRIPTION OF THE DRAWINGS

The accompanying drawings, which are incorporated in and constitute a part of this specification, illustrate embodiments of the disclosure and together with the general description of the disclosure given above and the detailed description of the drawings given below, serve to explain the principles of the disclosure.

It should be understood that the drawings are not to scale. In certain instances, details that are not necessary for an understanding of the disclosure or that render other details difficult to perceive may have been omitted.

FIG. 11 is a functional block diagram generally illustrating an embodiment of a manage state display in a gallery.

Like numerals refer to like elements throughout the several figures.

DETAILED DESCRIPTION OF EMBODIMENTS

Generally described, embodiments are disclosed that enable workflow as a service. Briefly stated, an on-premise or cloud-based workflow platform is described that enables users to develop workflows in a secure but remote environment, and to collaboratively share those workflows with other users. Providing an environment in which users may develop, execute, share, and consume workflows provides a major enhancement over existing workflow technologies.

Figure 1:
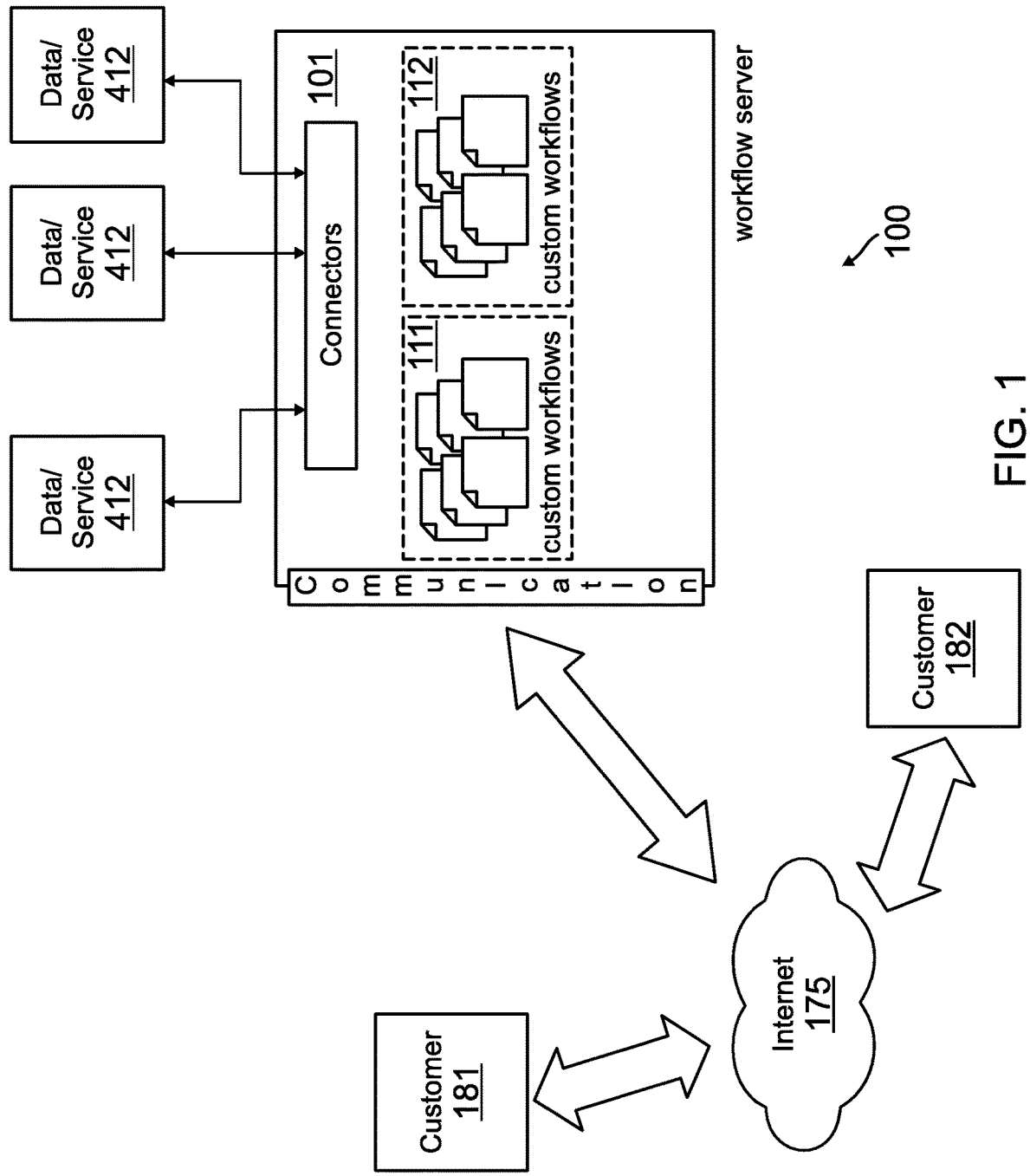
FIG. 1 is a functional block diagram generally illustrating a workflow as a service (WaaS™) environment in accordance with a preferred embodiment.

FIG. 1 is a functional block diagram generally illustrating a workflow as a service (WaaS™) environment 100 in accordance with a preferred embodiment. Shown in FIG. 1 is a workflow server 101 accessible over a local area networks or a wide area network 175, such as the Internet, by a plurality of customer computing devices (e.g., customer 181, customer 182). Workflows are pre-programmed mini-applications that streamline and automate a wide variety of business processes such as collecting signatures, gathering feedback, requesting approvals for a plan or document, or tracking the current status of a procedure. Although workflows are generally known, the preferred embodiment of the workflow server 101 implements a number of features previously unknown in the industry.

The workflow server 101 of the most preferred embodiment implements various features which each improves over existing workflow solutions substantially by greatly enhancing the power of the workflows through collaboration and sharing across various users and customers (user and customer used interchangeably herein) and through enhanced remote access. As illustrated, the workflow server 101 hosts at least a number of user-created workflows that are each accessible to their respective customers and other users. Generally stated, the workflow server 101 conceptually implements a number of separate tenants (e.g., 111, 112)

which act as secure boundaries within which a particular user or customer develops, stores, and executes their own bespoke workflows.

In accordance with the preferred embodiment, the workflow server 101 is remotely accessible by a number of user or customer computing devices, including for example, laptops, smartphones, computers, tablets, and other computing devices that are able to access the local area network or a wide area network where the workflow server 101 resides. In normal operation, each customer computing device connects with the workflow server 101 to interact with that customer's own workflows within that customer's tenant. As is also known, each workflow may, and likely does, employ a number of connectors to interact with data or services 412, for example, third party data or services like Salesforce, Facebook, Twitter, various cloud services, or any other data or service accessible through a network, including local area networks (for example a local application that is exposed as a WebService residing on-premises) or wide area networks (for example the Internet). In one example, an email connector may be used to send a pre-defined email as part of a workflow. In another example, a CRM connector may be used to issue a query to a customer relationship management cloud service that hosts important data for the customer. These and many other examples will be apparent to those skilled in the art.

For the purpose of this discussion, each customer computing device may take the form of computer software and hardware deployed in a local computing environment or perhaps in a remotely hosted computing environment. Each customer computing device may host or access its own workflows, perhaps executing on the customer's own premises. However, in accordance with the most preferred embodiment, a number of customer computing devices interacts with the workflow server 101 to manage the customer workflows remotely hosted at the workflow server 101. This arrangement gives rise to a number of features of the preferred embodiment which enables a workflow as a service environment, which has been previously unknown.

Figure 2:
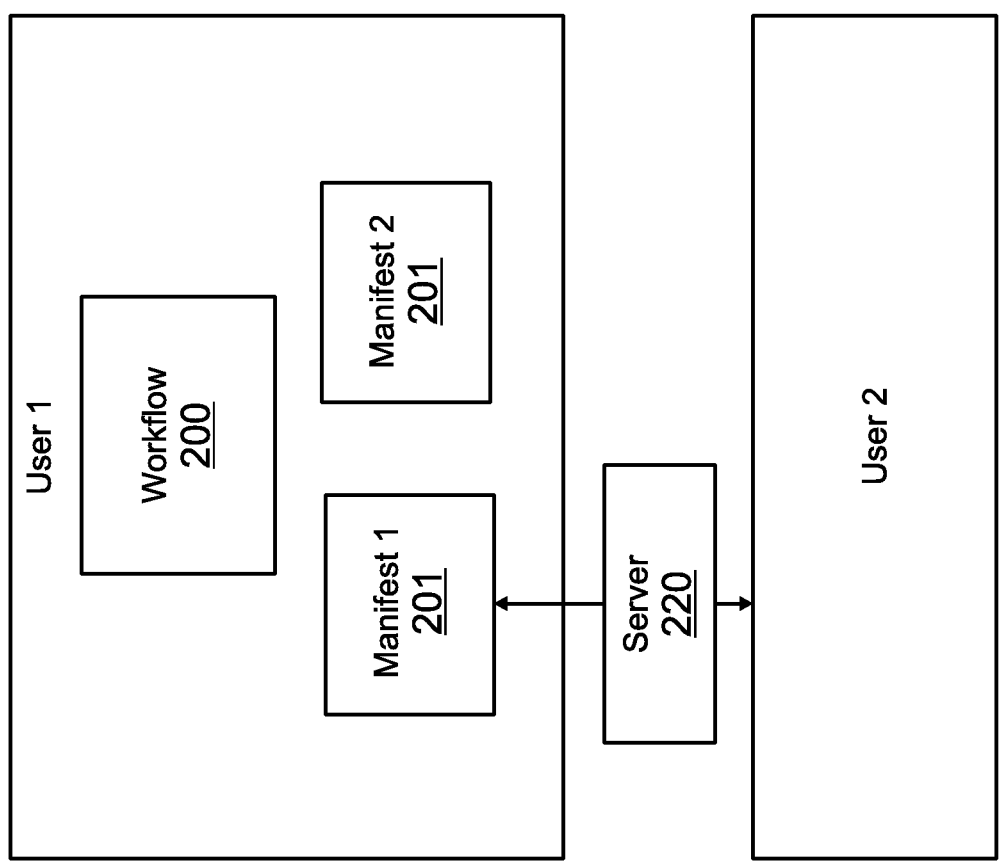
FIG. 2 is a functional block diagram generally illustrating a workflow communicating a manifest to a user.

FIG. 2 is a functional block diagram generally illustrating a workflow communicating a manifest to a user. The features enabled by the disclosed workflow as a service environment include, but are not limited to, the ability to embed, reuse and share workflows among a plurality of users and the ability to externally execute one or more shared workflows. In embodiments, as shown in FIG. 2, each workflow contains a manifest 201 with configuration requirements and disclosures regarding information that will be accessed, shared or potentially stored by the workflow through at least one server 220. In these embodiments, the manifest will be configured and generated by the workflow. Each of those features will be very briefly introduced here, and described in greater detail below with reference to FIGS. 2-6.

A workflow manifest 201, in basic terms, defines properties regarding the workflow 200 and an agreement with a user of the workflow 200, including disclosing information and resources the workflow 200 may access in the user's environment. To use the workflow 200, the user must accept the manifest 201. In embodiments, a workflow 200 may have multiple manifests 201, with each manifest 201 designed to address different business models or different user configurations. In embodiments, the manifest 201 does not expose intellectual property of the workflow 200 or how the workflow 200 operates; instead the manifest 201 describes configuration requirements for the user environment and information or data the workflow 200 will access on the user's device or within the user's environment. In an example, a manifest 201 will alert a user that a workflow 200 is accessing the user's Salesforce.com account or other specific web service.

Figure 3:
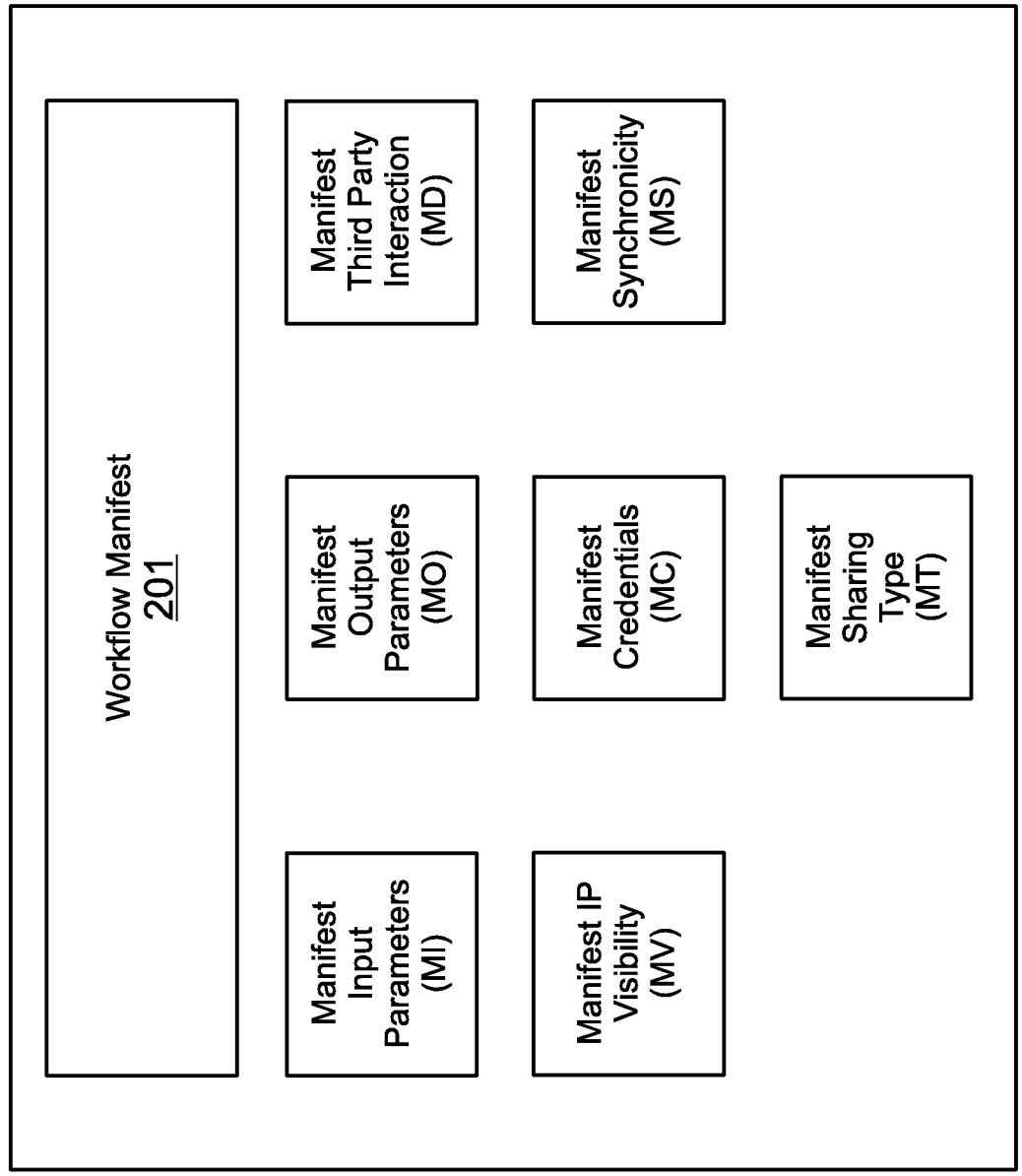
FIG. 3 is a functional block diagram generally illustrating an embodiment of a manifest.

FIG. 3 is a functional block diagram generally illustrating an embodiment of a manifest In embodiments, a workflow 200 may have a required input or a required output or both a required input and output, depending on the design of the workflow 200. In these instances, the workflow manifest 201 will include fields describing the workflow input parameters (MI) and workflow output parameters (MO). Input parameters (MI) describe the types of input a workflow 200 can accept and can be any type supported by the workflow engine. Output parameters (MO) describe the types of output a workflow 200 will return upon execution of the workflow 200 and that may be retrieved upon execution of the workflow 200. Input parameters (MI) and output parameters (MO) can be of any data type depending on the environment and engine where the workflow 200 is operating and the desired output from the workflow 200. For example, if a workflow 200 is designed to call upon a third-party software as a service (SaaS), the input parameters (MI) and output parameters (MO) may be of polymorphic data types, such as strings, picklists, references, Booleans, currencies, integers, percentages, IDs, dates and time, URLs, complex data types (such as C structures), or email data depending on data fields involved in the workflow 200. In other embodiments, the input or output data types of the WaaS workflow are abstracted such that a workflow action that encapsulates a call to a SaaS does not expose directly to the user what input or output data types are needed by the SaaS. Each input parameter (MI) can be marked in the manifest 201 as either being mandatory type (the data must be input into the workflow 200) or optional type (the data is not needed, but can be provided). Input parameters (MI) can also be of a default type, wherein the parameter does not need to be provided to the workflow 200. In instances where the parameter is default (i.e., not provided or not output), default values are used by the workflow 200 instead. Where default values are used, the manifest 201 states what default values will be used for each default parameter.

In embodiments, input parameters (MI) and output parameters (MO) are automatically generated by the workflow 200 when the workflow 200 is designed. When automatically generated, the input parameters (MI), output parameters (MO), or both can all be automatically marked as mandatory type, with the option of the workflow designer to change the designation type before exposing the workflow 200 to a user. Once the user receives the workflow 200, the input parameter (MI) type and output parameter (MO) type cannot be changed by the user.

In embodiments, the workflow 200 can not only execute predefined actions within a third-party SaaS, such as Salesforce, which includes numerous Salesforce specific actions designed to utilize the Salesforce proprietary functions, the workflow 200 can also execute generic actions within third-party web services, for example, in an embodiment, the workflow 200 can access a service exposed as web service that is supported as an action by the workflow. When the workflow 200 is designed to interact with third-party SaaS and web services, the manifest 201 will include a manifest third-party interaction (MD) field that includes a list of all the third-party services that will be accessed or utilized by the workflow 200. This third-party interaction (MD) field can be generated by the workflow 200 automatically when the workflow 200 is created, and thus when all the third-party services to be accessed or utilized are known. For example, in embodiments, since the workflow design is done through predefined actions (e.g., low code), the designer knows how the workflow will interact with third-party services (e.g., SaaS) and will know the URLs of web services accessed by the workflow. In an embodiment, the third-party interaction (MD) field, once created, cannot be modified by the user. In embodiments, the third-party interaction (MD) field of the manifest 201 lists one or more of the following: actions used by the workflow 200 for a given SaaS or web service and access types (e.g., read, write or read/write) used by the workflow 200 on data. For example, if the workflow 200 is designed to perform generic actions through a web service, the third-party interaction (MD) field may list a high-level URL it will access, an action call to be performed by the web service, and whether user data accessed by the workflow 200 for performing the action will be read, write, or read/write (or some other access type). In some embodiments, the third-party web service to be called by the workflow 200, or a third-party web service interacting with a predefined workflow action, will be known by the user prior to use of the workflow. In other embodiments, the third-party web service to be called by the workflow 200, or the third-party web service interacting with a predefined workflow action, may be generic in nature or unknown by the user prior to use of the workflow 200. When the third-party web service is generic in nature or of unknown type, the third-party interaction (MD) field may not, prior to use of the workflow 200, determine whether user data accessed by the workflow 200 for performing the action will be read, write, or read/write (or some other access type). In other embodiments, the third-party interaction (MD) field may distinguish between services, wherein the third-party interaction (MD) field may distinguish one service as read, another service as write, and any combinations thereof. If, for example, the third-party web service to be called by the workflow 200 is of some unknown type, the manifest 201 will list the web service or URL for the web service in the third-party interaction (MD) field and it would be a decision of the user utilizing the work flow whether the user trusts the third-party service listed in the third-party interaction (MD) field.

In embodiments, the workflow manifest 201 includes in a manifest credentials (MC) field a list of credentials required to access third-party services accessed or utilized by the workflow 200. For example, the workflow manifest 201 can, in embodiments, automatically generate the list of required credentials based upon the third-party services listed in the third-party interaction (MD) field. In embodiments, the user can enter the required credentials, such as passwords, to access the required or desired third-party services, such as third-party SaaS (e.g., Salesforce) and web services (e.g., email), needed to operate the workflow 200. In embodiments, for each third-party service listed in the third-party interaction (MD) field, the manifest credentials (MC) field can be defined as mandatory (credentials required from the user) and/or default (if credentials are not entered by the user, the workflow 200 will use credentials already entered into the workflow 200). Also, in embodiments, credentials entered into the manifest credentials (MC) field are encrypted (e.g., oAuth encrypted) to provide security.

In embodiments, the workflow manifest 201 includes in a manifest synchronicity (MS) field for the workflow 200 a description of whether a workflow 200 can be called synchronously, asynchronously or both. A synchronous workflow 200 is a workflow that will not respond to a user with a final result until the workflow 200 is completely executed or the workflow 200 fails. An asynchronous workflow 200 is a workflow that responds immediately to a user when the workflow 200 is called or begins execution. In an embodiment of an asynchronous workflow 200, the workflow 200 will respond immediately to a user's call and then later will provide another callback (e.g., a webhook) to notify the user when the workflow 200 is completed or has failed. In an embodiment, the callback is not mandatory, and in another embodiment, the user can choose a "fire and forget" option meaning that the user does not require a callback notification whether the workflow completed or failed. In embodiment, output parameters (if any defined) for an asynchronously workflow are only available through the callback. In other embodiments, the synchronicity in the manifest synchronicity (MS) field is defined as "both" such that the user can decide how to call the workflow 200, which will then operate as either synchronously (Sync) or asynchronously (Async). In an embodiment, the manifest synchronicity (MS) field is Sync by default. In another embodiment, the manifest synchronicity (MS) field is Async by default or is defined as both Sync and Async by default.

In embodiments, the workflow manifest 201 includes a manifest visibility (MV) field for the workflow 200 that describes whether the contents of the workflow 200 are visible or hidden from the user. In these embodiments, the workflow 200 creator can define whether a user can access or visualize the content of the workflow 200. If the content of the workflow 200 is not visible to the user, the workflow 200 appears as "black box" with only input/output parameters visible to the user. In an embodiment, the visibility of the workflow 200 is marked as hidden by default. A hidden workflow 200 works to protect the intellectual property of the workflow 200 and is a mechanism that may be used to help monetize the workflow 20 and prevent copying of the workflow 200 by the user or others. These embodiments permit a business model that allows for a limited license to be purchased by the user to increase the visibility to the workflow 200 such that the user could modify or create derivatives of the workflow 200.

In embodiments, the workflow manifest 201 includes a manifest sharing type (MT) field for the workflow 200 that describes the sharing type of the workflow 200. Workflows 200 can be shared in numerous ways, including but not limited to the following sharing types: tenanted, exported, and linked.

In a tenanted sharing type, the workflow 200 runs on the workflow tenant (e.g., on a server of an owner of the workflow). In the tenanted sharing type embodiment, visibility in the manifest visibility (MV) field is typically marked as hidden. In embodiments, even if tenanted, the workflow 200 can be marked as visible, for example, in a case where a person using the workflow 200 is in the same tenant as a creator of the workflow, such that the creator of the workflow 200 can use the manifest visibility (MV) field to specify if other users of that tenant can or cannot see the content of the workflow. Credentials in the manifest credentials (MC) field for the tenanted sharing type embodiment are provided either by the user or the owner of the workflow 200, which are used to access third-party services. In embodiments, the credentials, when provided, may be used only in the context of the workflow 200 and by the workflow 200, such that a user may not otherwise access the credentials.

In a tenanted sharing type, the hosting and credential possibilities of the workflow 200 may vary depending on the host and/or defined credentials. In one embodiment, the workflow 200 may be hosted on a first tenant belonging to a first user, such as a partner, wherein the workflow 200 may use credentials from a second user, such as a customer, in a second tenant. The credentials provided by the second user may be fully masked to the first user and/or first tenant as part of the manifest requirements. The first tenant may incorporate the credentials provided by the second user into the workflow 200 and then provide the workflow 200 as an output to the second user. In another embodiment, the workflow 200 may be hosted on a first tenant belonging to a first user, using credentials provided by the first user, wherein the credentials provided by the first user may be part of the workflow manifest 201 requirements. The first tenant may provide the workflow 200 with the first user credentials as an output to a second user in a second tenant to be received by the second user, wherein the second user may have access to the workflow 200 only and not have access to the credentials provided by the first user. In other embodiments, the workflow 200 may be hosted on a second tenant belonging to a second user, using credentials provided by the second user, such that the credentials provided by the second user may be part of the workflow manifest 201 requirements, wherein the second user may manage the credentials without restriction to the credentials. In another embodiment, the workflow 200 may be hosted on a second tenant belonging to a second user, wherein the workflow 200 may use credentials provided by a first user in a first tenant, such that the credentials provided by the first user may be part of the workflow manifest 201 requirements, wherein the second user may not have access to the credentials provided by the first user.

In an exported sharing type, the workflow 200 runs on the user's tenant (e.g., on a server of a user of the workflow) with the user downloading and running at least a portion of the workflow 200 (up to the entire workflow 200) on the user's tenant. In an embodiment, the user receives a full copy of the workflow 200 at the user's tenant and there are no components of the workflow 200 running on the workflow's tenant. In these embodiments, the visibility in the manifest visibility (MV) field can be set as hidden or visible. If credentials in the manifest credentials (MC) field for third-party services are provided by the workflow owner or the credentials in the manifest credentials (MC) field were marked as default and not provided by the user, then credentials can be transferred (in encrypted form) with the workflow 200 to permit the third-party services to be accessed by the workflow 200. In embodiments, a time limit can be set for how long the workflow 200 will operate on the workflow tenant or the user tenant. These embodiments permit a business model where a limited license to the workflow 200 can be sold for certain time periods (e.g., 1 year), which will no longer operate after the time period unless the user purchases a further license.

In a linked sharing type, which can also be of an exported sharing type, the workflow 200 runs on the user's tenant (e.g., on a server of a user of the workflow) with the user downloading and running at least a portion of the workflow 200 (up to the entire workflow 200) on the user's tenant. In the linked sharing type embodiments, the workflow is linked to the workflow's tenant such that when a new version of the workflow 200 is available, the user can decide which version of the workflow 200 to use and whether or not to download the update of the workflow 200. In these embodiments, the user can choose whether an update to a workflow 200 is downloaded immediately so that any new execution of the workflow 200 will be with the updated version. With the immediate update, in an embodiment, the updated version of the workflow 200 replaces the prior version of the workflow 200. The user can also choose, with an instance option, to have any currently running workflows continue using the prior version of the workflow 200 and that any new instances of the workflow 200 use the newer version of the workflow 200. A user could also choose which versions of the workflow 200 to use for certain tasks. For example, if the workflow 200 was a tax workflow, a user could choose to have 2016 taxes run with the 2016 version of the workflow and that 2017 taxes be run using the 2017 version of the workflow. In another embodiment, using a validated option, the user can choose to have the workflow 200 continue using the prior or current versions of the workflow 200 until the user validates that the latest version of the workflow 200 should be used. The validated, immediate and instance modes can be changed by the user and business models can be fashioned around charging different license fees for each mode. As with other embodiments, the visibility in the manifest visibility (MV) field for linked sharing type workflows 200 can be set as hidden or visible and the credentials in the manifest credentials (MC) field for third-party services can be provided by the workflow owner or the manifest credentials (MC) field directly depending on the license paid.

In other embodiments, a manifest may comprise access keys, wherein the workflow 200 runs on a first user's tenant and access keys allow for a third-party user to have access to a specified workflow residing in the first user's tenant. Access keys may comprise identification rights, credentials, or other identifying forms and/or methods. Access keys may provide one or more users specified by the manifest or tenant, access to only a pre-determined workflow. In some embodiments, access keys may be time based, such that upon expiration of a pre-determined time, the access key expires and the manifest rescinds access to the workflow. In other embodiments, a manifest may comprise access keys while retaining authority to rescind or revoke access to the workflow.

Using the various options and modes in the workflow manifest 201, different business models are available for licensing, selling, and providing the workflows 200 and workflow functionality to the users. For instance, in a business model, workflows 200 may be exported to a user with the manifest visibility (MV) field set to visible for showing the user the contents of the workflow 200. In these embodiments, the workflow license fee can be higher based on the user's access to the contents of the workflow 200 and credentials for access to third-party services. In a business model where the workflow 200 is provided as a linked sharing type in the manifest sharing type (MT) field and the manifest visibility (MV) field is set to visible, the workflow owner can create an openSource type model potentially with a license per use fee. Related, where the workflow 200 is provided as a linked sharing type in the manifest sharing type (MT) field and the manifest visibility (MV) field is set to hidden, the workflow 200 could be sold or licensed as a workflow as a service but not charge the user for the associated costs of the workflow 200, such as hosting expenses. In another business model, the workflow 200 is sold as a service as a tenanted sharing type (MT), which can be charged to the user based on per use, time (perpetual or limited time based), or number of transactions. In another business type, the workflow is sold or licensed as an exported sharing type (MT) with the manifest visibility (MV) field set to hidden. In these embodiments, the workflow 200 can also be sold or licensed to the user per use, time (perpetual or limited time based), or number of transactions.

The manifests 201 described above are used in conjunction with workflows 200. Like manifests 201, workflows 200 also have several features that are unique and help improve the WaaS environment 100 over previous solutions. In addition, each of the foregoing workflow 200 features working in tandem achieves a synergistic effect for accomplishing a greatly improved workflow environment. Each of those features will now be described in greater detail with reference to the attached FIGS. 2-6.

A tenant or user may also use a manifest 201 to take multiple workflows, actions, and events, and any combinations thereof, and aggregate them into a single workflow that may then be offered to another user and/or tenant. In one embodiment, a combination of two or more workflow, actions, or events may be aggregated into a single manifest and then offered for use as a single workflow. In another embodiment, there may be a set of workflows, actions, or events, each with a manifest, which is then aggregated into a single workflow for use by a tenant or user. In one embodiment, where the execution of a workflow requires the workflow to call one or more additional workflows, the actions, credentials, or events required by each workflow is aggregated into a single manifest to be accepted by a user, wherein the combination of workflows are offered for use as a single workflow following the user accepting the single manifest. In another embodiment, wherein the single manifest comprises a first workflow that calls one or more additional workflows, the single manifest may aggregate actions, credentials, or events required by each workflow without aggregating the manifest fields of each workflow.

Re-usability of workflows refers to a feature of the workflow server 101 that enables workflows created by a particular customer to be shared with other customers across the WaaS environment 100. In the most preferred embodiment, a customer creates an original workflow, and makes that original workflow available to other customers, such as in a gallery of shared workflows. Other customers may remotely execute an instance of that shared workflow within their own tenant or secure execution environment, for example, in an embodiment, remote execution of the workflow is controlled by the sharing type provided in the manifest synchronicity (MS) field (i.e., tenanted, exported, or linked).

A feature that helps make possible the re-usability of workflows is the ability to externally start a workflow from outside the tenant. As noted above, the tenant operates as a security boundary within which a customer's bespoke workflows resides and executes. In other words, to implement shareability of customers' workflows, the workflow server 101 enables a workflow in one tenant to be launched or executed by workflows executing in other tenants.

A workflow may also be shared or exposed to other users and tenants on various different mediums, such as a public platform, a private platform, a direct push or direct access because of a known endpoint, or an external request. One embodiment of a public platform may comprise a gallery wherein the creator of a workflow may publish or post the workflow in a shared location for any user to access. An embodiment of a private platform may comprise the creator of a workflow posting the workflow in a shared location for only specific tenants and/or users to access. Such an embodiment may result in the posted workflow being available to only one or more of the selected tenants and/or users. In a direct push embodiment or direct access embodiment, the workflow creator may, at the request of a tenant or user, push the workflow to the tenant or user who requested the workflow as a result of knowing the endpoint that will receive the workflow, wherein no platform or intermediate access location may be necessary. In an external request embodiment, the tenant or user that requests a workflow may, once manifest requirements and agreements have been met, send a trigger to a tenant hosting a workflow to start the workflow.

Figure 4:
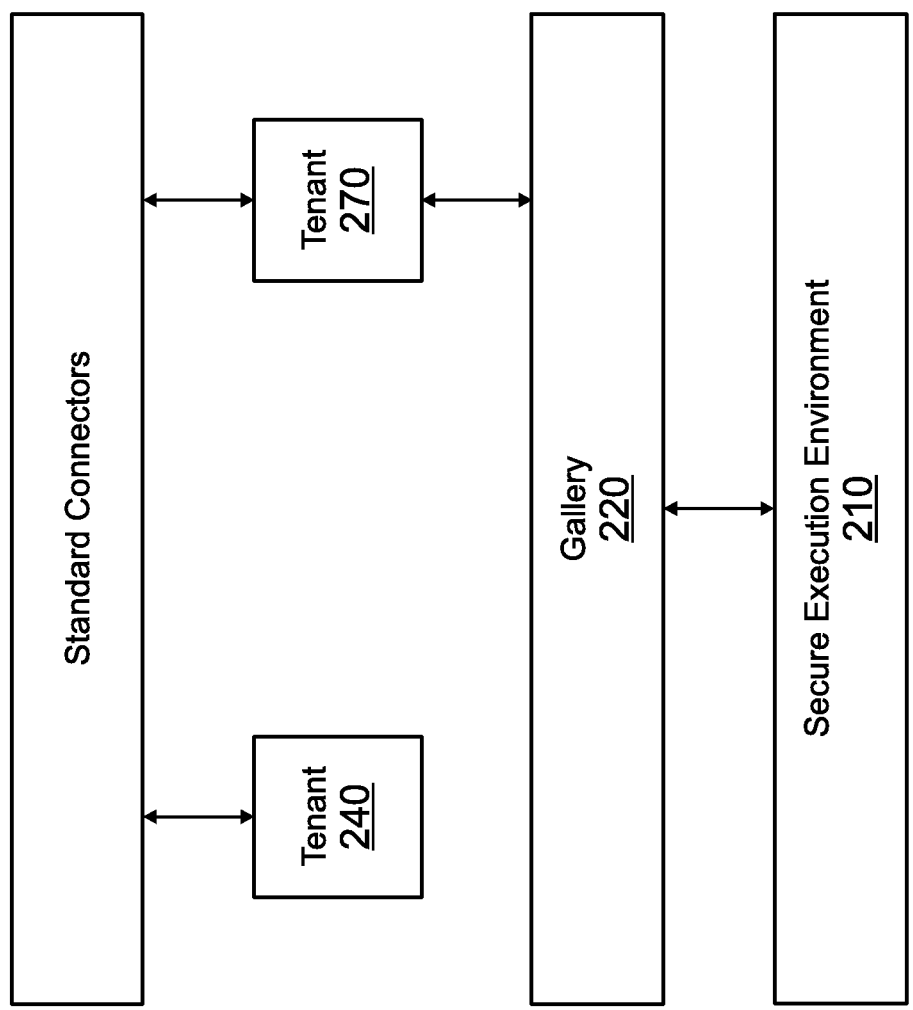
FIG. 4 is a functional block diagram generally illustrating a workflow server in which workflows are shareable among customers.

FIG. 4 is a functional block diagram generally illustrating a workflow environment in which workflows are shareable among customers. In embodiments, a workflow server implements a plurality of tenants 240 and 270, which each act as a security boundary to prevent access by one customer of another customer's data and information, including workflows. Each of several workflows may be stored for repeated use once deployed. As is understood in the art, workflows generally make use of standard connectors, which may accept security credentials for third-party services.

As shown in FIG. 4, one particular tenant 240 is associated with a first customer, and a second tenant 270 is associated with another customer. In each tenant resides one or more workflows associated with the tenant's customer. Under ordinary circumstances, the workflows in one tenant are inaccessible to other workflows or processes residing in another tenant. One embodiment may implement a platform 220 that is a separate secure location in which a customer may publish a customer workflow for use by other customers.

In an embodiment, a platform 220 may act as a showroom or browsable repository of workflow descriptions so that other customers may search or browse shared workflows. In one embodiment, a platform 220 may comprise a gallery. A gallery may implement a showroom for shared workflows so that various customers may locate pre-existing workflows that may already exist to perform desired operations. Within a gallery, sufficient information may be presented to enable a browsing customer to determine what variables and third-party interactions are either available or necessary for a particular shared workflow. Once a customer indicates a desire to execute a shared workflow, a checkout procedure may be conducted to associate the shared workflow with the acquiring customer.

In operation, it should be noted that a secure execution environment is used to execute each instance of a workflow to avoid the possibility of inadvertent disclosure or cross-contamination of data. Accordingly, although the actual original workflow continues to reside in the tenant (e.g., tenant 270) of the developing customer, an instance of that workflow is executed within the secure execution environment using the credentials of the tenant (e.g., tenant 270).

Within the concept of WaaS, where in embodiments applications call workflows as a service, a workflow may reference a remote workflow within its design as well. For example, when an instance of a first workflow is started, it may reference a second remote workflow, which may be, in embodiment, a workflow that is within a separate environment. A workflow created using this structure sets up a parent-child relationship between the original first workflow and the second remote workflows being referenced. By using remote workflows in this structure, parts of a workflow can be easily updated in isolation without making updates to the "parent" workflow. Moreover, an advantage of having workflows calling each other in this parent-child relationship is the ability to update workflows as they are running. For example, a child workflow can be updated and then a parent workflow that may already be in progress will be updated when the parent workflow invokes the child workflow.

The benefits of shared workflows are many, and include: componentized modules of workflow allowing ease of swapping in and out (a pre-programmed mini-application), containerization of workflows, and package workflows as reusable components.

Figure 5:
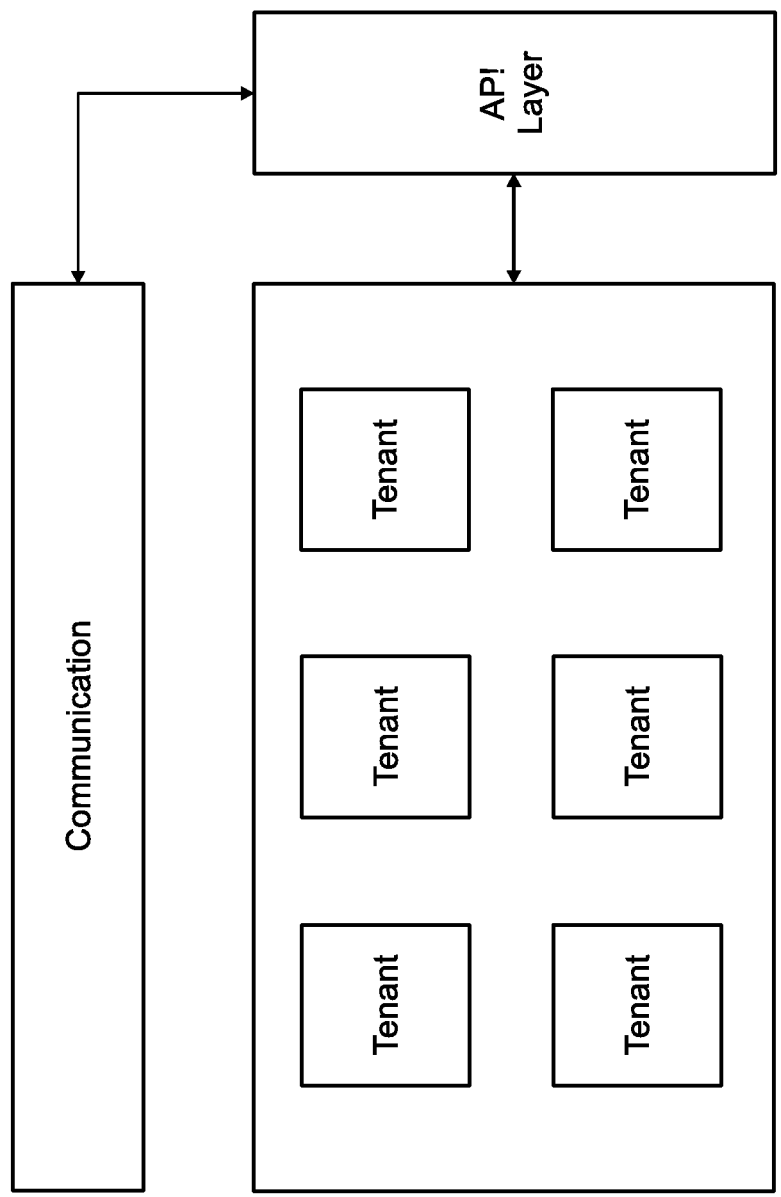
FIG. 5 is a functional block diagram generally illustrating a workflow environment in which workflows may be externally executed by processes outside of the workflow's secure environment.

FIG. 5 is a functional block diagram generally illustrating a workflow environment in which workflows may be externally executed by processes outside of the workflow's secure environment. As noted above, implementing shared workflows requires that an instance of that workflow be made available to other customers. Accordingly, the preferred embodiment provides a remote workflow that can be started or executed using an external API call. In other words, a remote workflow can be referenced and consumed by other applications providing pre-programmed and reusable components. In this way, shared workflows can be created in a highly componentized structure where the application could be made up of one or many remote workflows.

As generally illustrated in FIG. 5, a tenant hosts a number of workflows, including at least one shared workflow. Ordinary (non-shared) workflows may be fully contained within the tenant and are not accessible directly from outside the tenant. However, a shared workflow includes at least an external start component that implements an externally accessible API. The external API may be called by any remote computing device using ordinary HTTP calls and transactions. In this way, the shared workflow may be called (or executed) from outside the tenant by a remote computing device having the appropriate credentials.

The API enables a customer to specify whether to run the version of the remote workflow known at time of reference, or opt to always run the latest version of the remote workflow at time of execution. This allows applications that consume remote workflows to either remain constant by adhering to a specific version at a point in time, or get the most recent version of the remote workflow.

As noted above, a remote workflow executed by API will run with security credentials based on where the remote workflow was created. Therefore, when a remote workflow is referenced by other applications it becomes a service that is provided to the application or "parent" workflow. Through this, the application or "parent" workflow is able to process/consume data and information without needing to reference it directly; using the remote workflow, data and information can be kept secure within the execution of the remote workflow being referenced.

In one embodiment, a tenant may modify an existing workflow that is already published or accessed by a customer. The tenant may attempt to push the modifications to the workflow, wherein the tenant's attempts may comprise pushing the modifications directly to the customer's tenant, targeting a third-party service, going into the third-party service safe state, and publishing through an API call. The tenant's attempts to push the modifications to the workflows may further comprise pushing data and structure to the workflow, and providing the customer the option to accept or reject the push, wherein the API brings in the modifications to the user if the user accepts. The tenant's attempts may further comprise automatic push of modifications to the workflow, system management reconciling of running multiple workflow versions by more than one customer, reconfiguration determinations, and automatic connection to the customer when a modification is available.

In other embodiments, a workflow 200 may start as a result of a triggering event. A triggering event for a workflow may be defined as an event that initiates a workflow to begin running. There may be an extensive variety of events that can serve as a triggering event. In a preferred embodiment, a workflow 200 may have only one triggering event, coupled with an option to start manually. In another embodiment, a workflow 200 may have only one triggering event without an option to start manually. In other embodiments, a workflow 200 may have two or more triggering events, with or without the option to start manually. In one embodiment, a triggering event for a workflow 200 may be an input parameter provided by a user. Input parameters may be of polymorphic data types, such as strings, picklists, references, Booleans, currencies, integers, percentages, IDs, dates and time, URLs, complex data types (such as C structures), or email data depending on data fields involved in the workflow 200. In another embodiment, a triggering event for a workflow 200 may be an output parameter. Output parameters may be of polymorphic data types, such as strings, picklists, references, Booleans, currencies, integers, percentages, IDs, dates and time, URLs, complex data types (such as C structures), or email data depending on data fields involved in the workflow 200.

Some embodiments may comprise a triggering event that is based on time. One embodiment of a timed trigger may be a scheduled triggering event, wherein upon the occurrence of a scheduled triggering event, a workflow may be triggered to begin running. A scheduled triggering event may be defined as a pre-determined time of the day, day of the week, date of the month, date of the year, reoccurring time, reoccurring day, reoccurring date, or any other single time, day, or date, or combinations thereof, that may be scheduled to occur once or on a repeated or continual basis. Another embodiment of a timed trigger may be a set lapsed amount of time, wherein upon occurrence of the set lapsed amount of time, a workflow is triggered to begin. Another embodiment of a timed trigger may be a set lapsed amount of time since the occurrence, or non-occurrence, of an event, wherein once the set lapsed amount of time has passed since the occurrence or non-occurrence of an event, a workflow is triggered. Other embodiments of a timed trigger may comprise a timed countdown that may serve as a triggering event, wherein upon the timed countdown reaching a specified time, such as zero, a workflow may be triggered to start. A timed countdown trigger may comprise a timed countdown preset to begin running at a set time, a timed countdown predetermined to begin to run upon the occurrence or non-occurrence of an event, or a user manually starting a timed countdown triggering event.

Another embodiment may comprise a manual trigger as a triggering event. A manual trigger may be defined as the occurrence of an event, wherein it is predetermined that a workflow will begin to run upon occurrence of the event. An embodiment of a manual trigger may be an option to immediately start a workflow, which a user can manually select. Options to manually start a workflow may be found in workflows, web services, SaaS, third-party web services, third-party SaaS, web-based applications, and third-party web-based applications.

One embodiment may comprise a conditional event as a triggering event. A conditional trigger may be defined as the occurrence of one or more conditions before a workflow begins to run. An embodiment of a conditional trigger may comprise an event, coupled with a workflow, that may be manually selected to begin, wherein it is predetermined that the coupled workflow will begin to run as a result of the manual selection of the event. Options to manually select an event coupled with a workflow may be found in workflows, web services, SaaS, third-party web services, third-party SaaS, web-based applications, and third-party web-based applications. Other embodiments of a conditional trigger may comprise the manual selection by a user of two or more options from a finite number of options, wherein certain combination of options are predetermined to run a workflow upon selection of the predetermined combination of options. Manual selection of two or more options from a finite number of options may be found in workflows, web services, SaaS, third-party web services, third-party SaaS, web-based applications, and third-party web-based applications. One embodiment of a conditional trigger may comprise an event that may be manually selected by a user, wherein it is predetermined that if a user does not manually select the event, a workflow will be triggered. Another embodiment of a conditional trigger may comprise two or more options from a finite number of options that may be manually selected, wherein it is predetermined that if a user does not manually select a specified option or combination of options, a workflow will begin to run. Another embodiment of a conditional trigger may comprise a workflow that begins to run upon the creation of items or workflows, alteration or change to a workflow, an item in a list, or other changes within a workflow, web services, SaaS, third-party web services, third-party SaaS, web-based applications, or third-party web-based applications.

In another embodiment, a form submission may serve as a triggering event. A form submission trigger may be defined as the tendering of a data sheet, or form, that triggers a workflow to begin to run. An embodiment of a form submission trigger may comprise a SaaS submitting a form, wherein upon submission of the form a workflow is triggered. Form submission triggers may be found in workflows, web services, SaaS, third-party web services, third-party SaaS, web-based applications, and third-party web-based applications.

In another embodiment, a call from another workflow may serve as a triggering event. A workflow call trigger may be defined as a workflow invoking a trigger for another workflow to begin to run. A workflow call trigger may be in the same tenant as the triggered workflow or may be in a tenant different and separate from the triggered workflow. Workflow call triggers may comprise of previously mentioned timed triggers, manual triggers, conditional triggers, form submission triggers, and third-party SaaS triggers.

In one embodiment, a third-party SaaS event may be a triggering event. A third-party SaaS trigger may be defined as the occurrence of an event within a third-party SaaS that triggers a workflow to begin to run. Third-party SaaS triggers may be the result of input parameters or output parameters. Third-party SaaS triggers may also comprise previously mentioned timed triggers, manual triggers, conditional triggers, form submission triggers, and call triggers.

Figure 6:
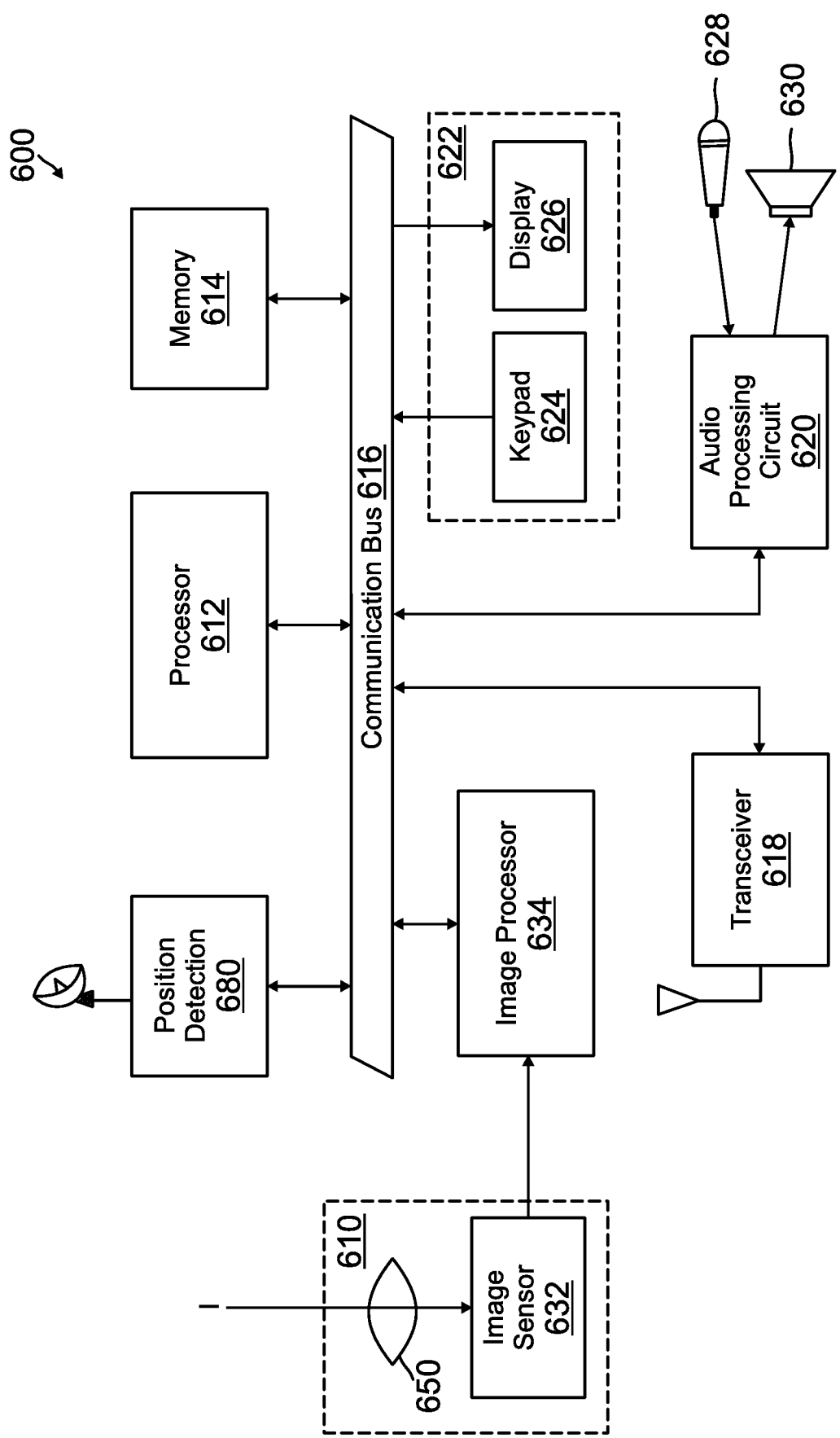
FIG. 6 is a functional block diagram generally illustrating one possible example of a computing device that may be used to implement various embodiments.

FIG. 6 is a functional block diagram generally illustrating one possible example of a computing device 600 that may be used to implement various embodiments. As shown, computing device 600 includes several functional components to enable workflows, including but not limited to remote workflows. The example computing device may be implemented as one or more of any number of devices, such as a mobile phone, a tablet computer, a personal digital assistant, a notebook or ultrabook computer, a desktop computer, a server computer, a virtual machine, or the like.

The computing device 600 may include a processor 612, a memory 614, communication circuit 616, transceiver 618, audio processing circuit 620, user interface 622, image sensor 632, image processor 634, and optical system 650. Processor 612 controls the operation of the computing device 600 according to programs stored in program memory 614. The communication circuit 616 interfaces the processor 612 with the various other components, such as the user interface 622, transceiver 618, audio processing circuit 620, and image processing circuit 634. User interface 622 may include a keypad 624 and a display 626. Keypad 624 allows the operator to key in alphanumeric characters, enter commands, and select options. The display 626 allows the operator to view output data, such as entered information, output of the computing device 600, images or other media, and other service information. In certain computing devices, the user interface 622 combines the keypad 624 and the display 626 into a touchpad display.

The computing device 600 may also include a microphone 628 and speaker 630 though certain computing devices may not have such features. Microphone 628 converts sounds into electrical audio signals, and speaker 630 converts audio signals into audible sound. Audio processing circuit 620 provides basic analog output signals to the speaker 630 and accepts analog audio inputs from the microphone 628. Transceiver 618 is coupled to an antenna 636 for receiving and transmitting signals on a suitable communications network (not shown).

Image sensor 632 captures images formed by light impacting on the surface of the image sensor 632. The image sensor 632 may be any conventional image sensor 632, such as a charge-coupled device (CCD) or complementary metal oxide semiconductor (CMOS) image sensor. Additionally, the image sensor 632 may be embodied in the form of a modular camera assembly with or without an integrated optical system 650. Image processor 634 processes raw image data collected by the image sensor 632 for subsequent output to the display 626, storage in memory 614, or for transmission by the transceiver 618. The image processor 634 is a signal microprocessor programmed to process image data, which is well known in the art. A position sensor 680 detects the position of the computing device 600 and generates a position signal that is input to the microprocessor 612. The position sensor 680 may be a Global Positioning System sensor, potentiometer, or other measuring device known in the art of electronics.

Figure 7:
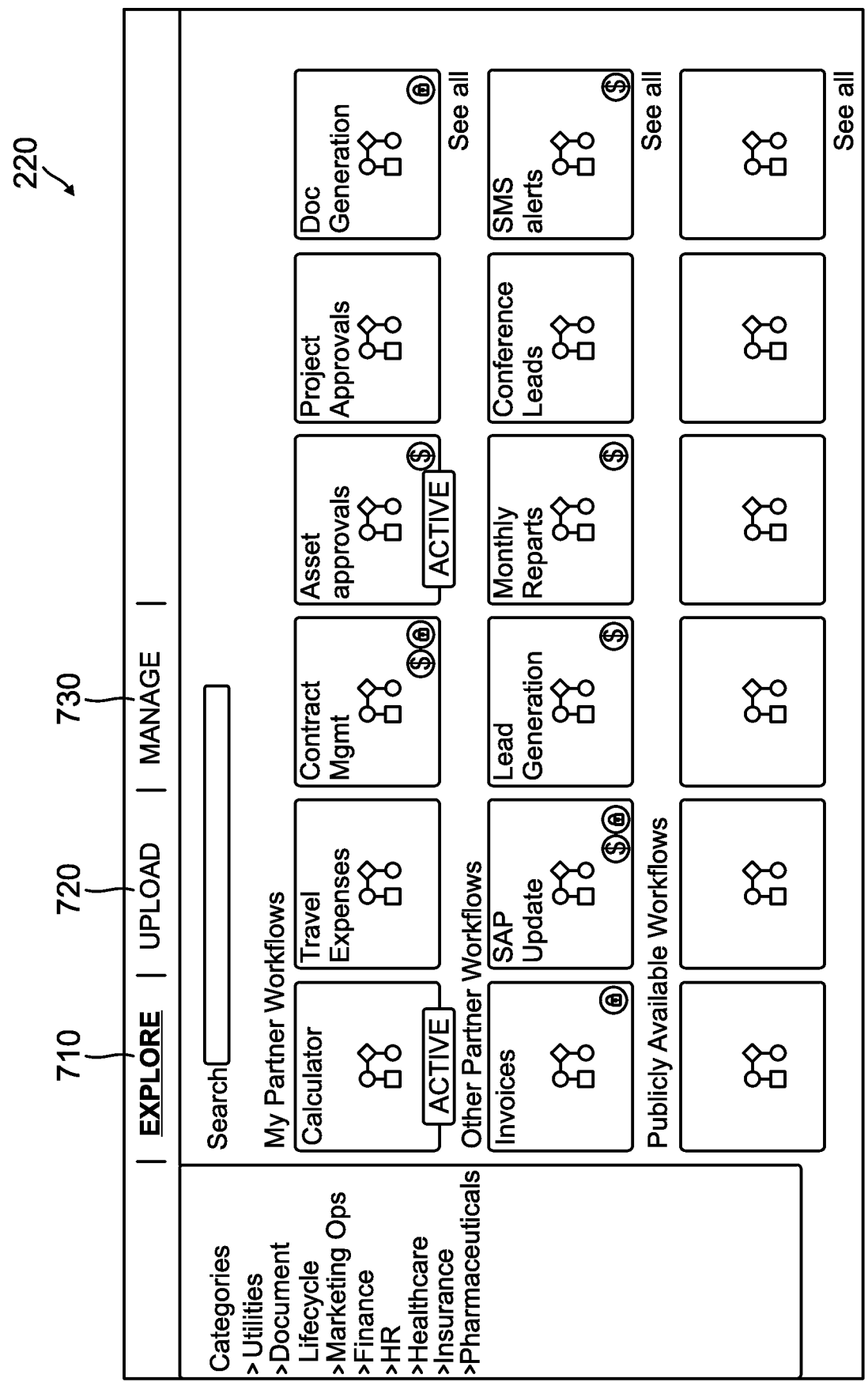
FIG. 7 is a functional block diagram generally illustrating an embodiment of a gallery.

FIG. 7 is a functional block diagram generally illustrating an embodiment of a gallery. In a preferred embodiment, the gallery may comprise user display options for at least three states of workflows for a customer. The three states of workflows may comprise an explore state 710, an upload state 720, and a manage state 730. The gallery may further comprise a display of, including but not limited to, workflows the customer's partners have provided, workflows available from other partners, and publicly available workflows. Displayed workflows in the gallery that require payment by the customer in order to access may comprise an icon construct, such as a dollar sign. Displayed workflows in the gallery that may not be edited by the customer may also comprise an icon construct, such as a lock symbol.

Figure 8:
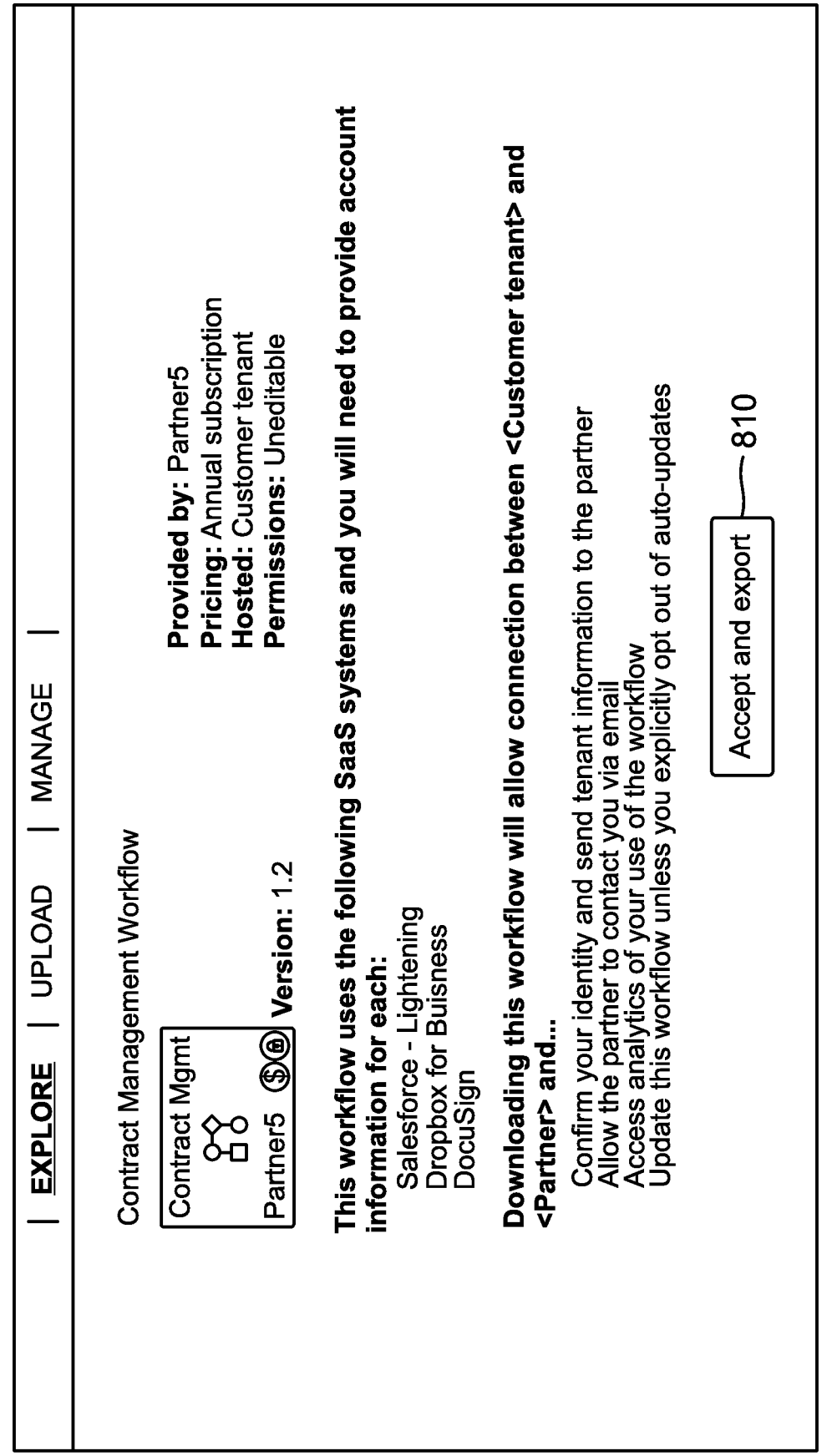
FIG. 8 is a functional block diagram generally illustrating an embodiment of an explore state display in a gallery.

FIG. 8 is a functional block diagram generally illustrating an embodiment of an explore state display 800 in a gallery. In a preferred embodiment, the explore state display 800 may comprise a title of the workflow, a general description of the workflow, a thumbnail art of the workflow comprising one or more icon constructs, workflow data comprising system configurations for third-party services and connection configurations, OAuth access details, and data related to the workflow provider, the workflow host, workflow authorization permission, or workflow pricing.

In one embodiment, the explore state display 800 may enable the partner to manage a transaction for the purchase of a workflow directly with the customer. In another embodiment, the explore state display 800 may enable the workflow sharing platform system to manage a transaction for the purchase of a workflow directly the customer. In other embodiments, the explore state display 800 may enable a combination of partners and the workflow sharing platform system to manage a transaction for the purchase of a workflow with the customer. The preferred embodiment may further comprise an Accept and Export tool 810 for the customer, wherein the Accept and Export tool 810 may enable the customer to export the displayed workflow to the customer's tenant, export the displayed workflow to a third-party service, or export the displayed workflow to another service provider.

Figure 9:
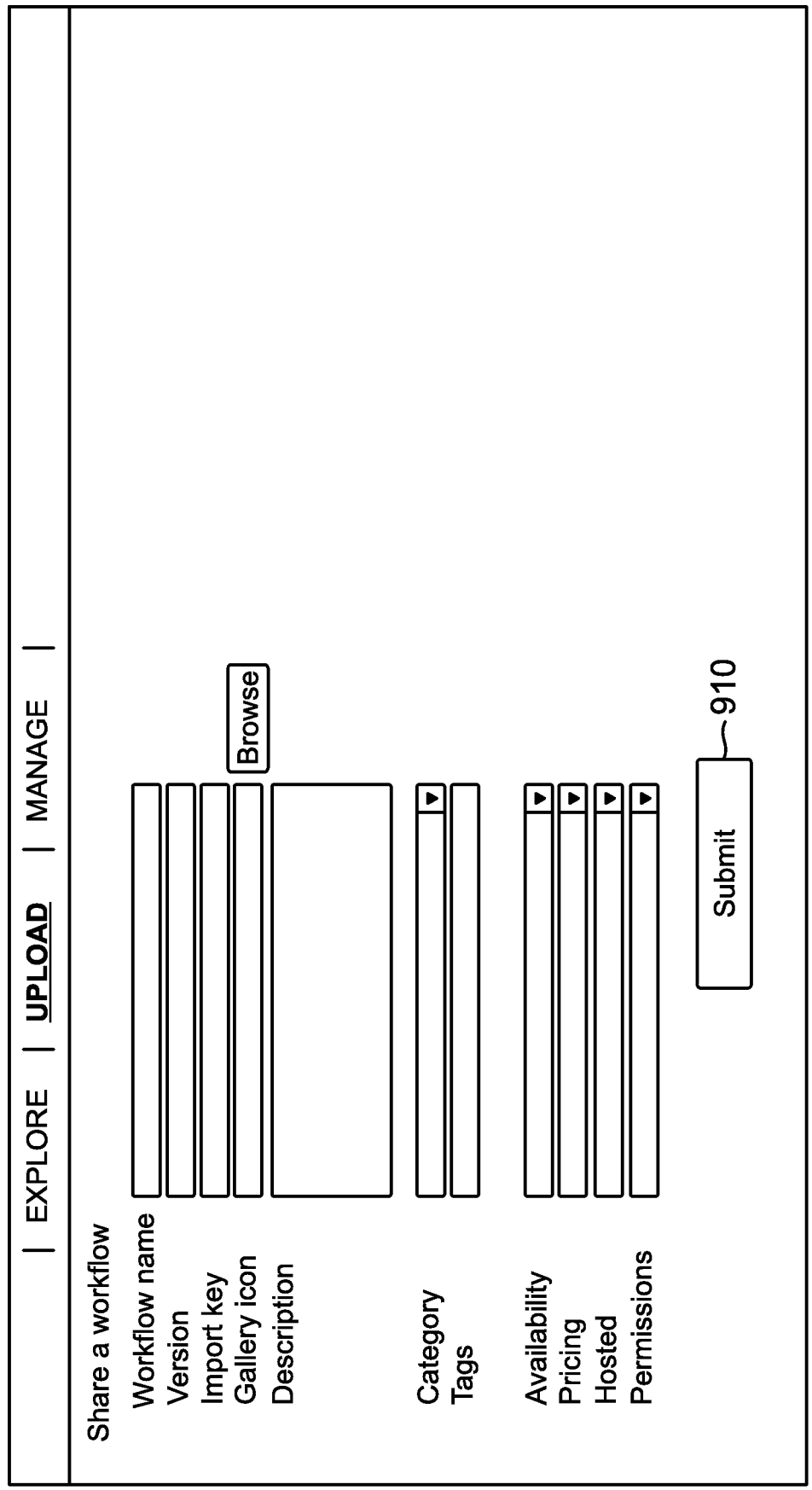
FIG. 9 is a functional block diagram generally illustrating an embodiment of an upload state display in a gallery.

FIG. 9 is a functional block diagram generally illustrating an embodiment of an upload state display 900 in a gallery is displayed in accordance with the upload state. In one embodiment, the upload state display 900 may comprise input fields for a workflow owner to define the workflow and enable options and capabilities for customer availability, pricing, hosted, and editable permissions. Availability options and capabilities may comprise the workflow owner selecting whether to offer general availability as opposed to availability to the owner's customers. Pricing options and capabilities may comprise the workflow owner selecting charging a one-time fee for usage of a workflow, allowing subscription pricing, providing consumption-based pricing, or providing the workflow for free. Hosted options and capabilities may comprise the workflow owner selecting whether the workflow can be hosted by the owner or hosted in the customer's tenant. Permissions options and capabilities may comprise the workflow owner selecting whether the workflow may be editable or uneditable. The upload state display 900 may further comprise a submit option 910, wherein the submit option transmits the workflow according to the selected hosted option.

Figure 10:
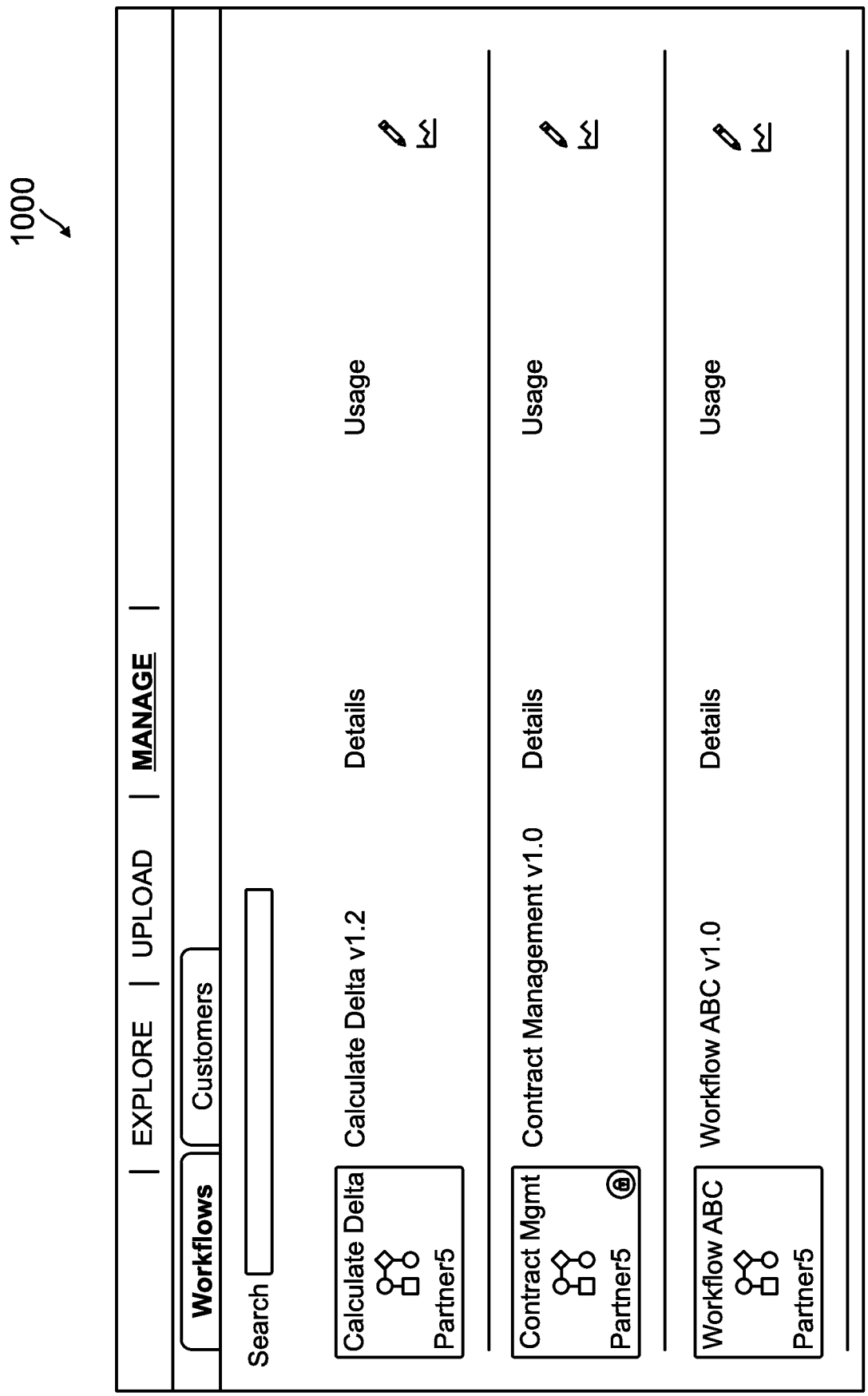
FIG. 10 is a functional block diagram generally illustrating an embodiment of a manage state display in a gallery.

FIG. 10 is a functional block diagram generally illustrating an embodiment of a user's workflow display 1000 within a manage state display in a gallery. In one embodiment, the manage state display may serve as a user dashboard and may comprise at least two user options for display, the at least two user options for display comprising a user's workflows display 1000 and a user's customers display 1100. The user's workflows display 1100 may comprise a list of one or more of the user's workflows, wherein the list displays the workflow title, description, details related to availability, pricing, hosted, and permissions, and analytical statistics, including but not limited to, usage history, user history, workflow version updates, and icon constructs for pricing and accessibility.

FIG. 11 is a functional block diagram generally illustrating an embodiment of a user's customers display 1100 within a manage state display in a gallery. In one embodiment, the user's customers display 1100 may comprise a list of one or more of the user's customers, wherein the user's customers display 1100 may also comprise the quantity of workflows associated with each customer, revenue associated with each customer, data related to agreements with a customer, and customer contact information.

Figure 12:
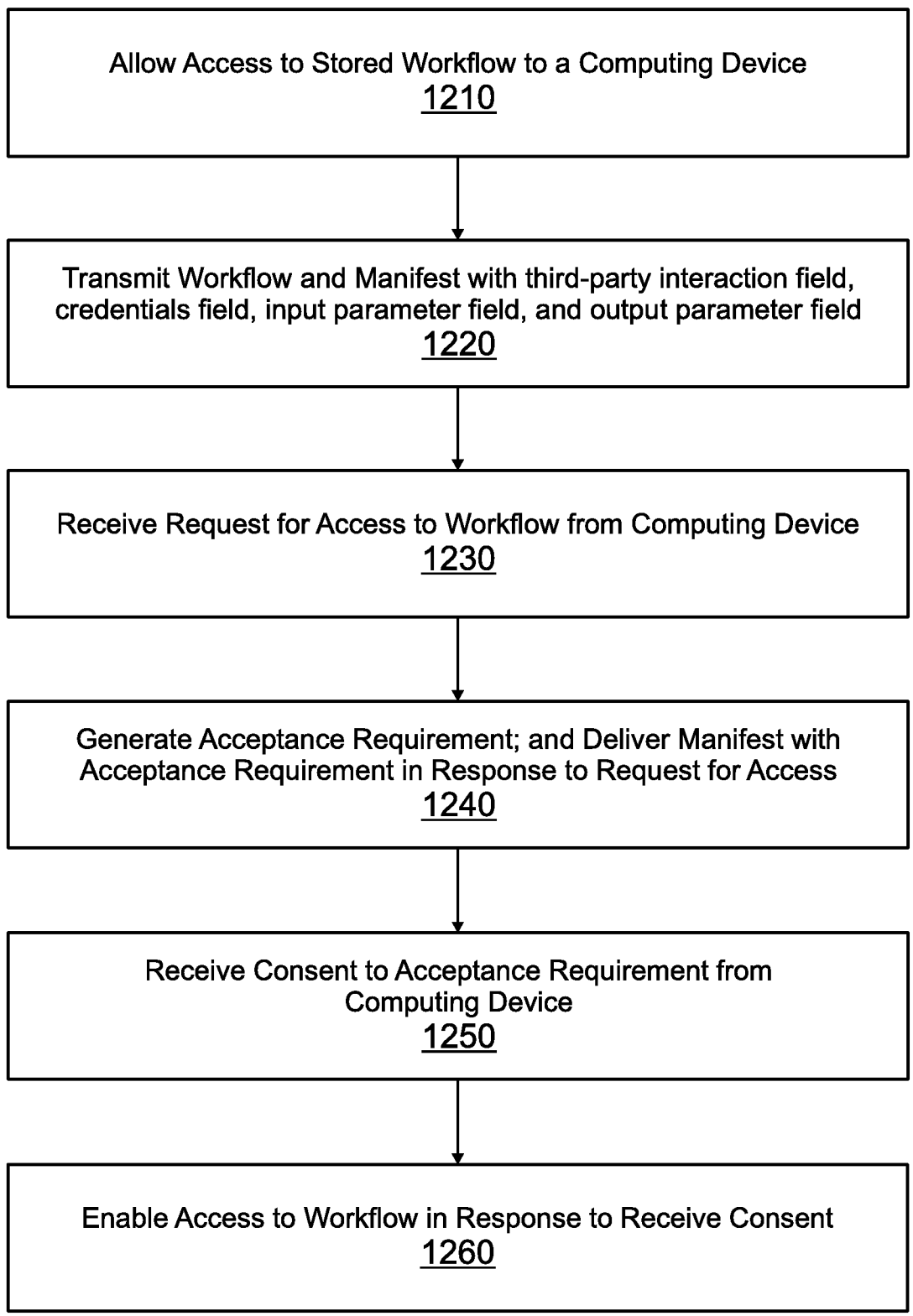
FIG. 12 is a functional block diagram generally illustrating a flowchart for an embodiment of a method for enabling access of a workflow to a computing device.

FIG. 12 is a functional block diagram generally illustrating a flowchart for an embodiment of a method for enabling access of a workflow to a computing device. As shown in FIG. 12, an embodiment of a method for sharing a workflow with a manifest may comprise a plurality of computing devices interconnected via a network, a workflow server, wherein the workflow server is configured to store a plurality of workflows in a plurality of workflow files, wherein the workflow server comprises at least one processor, wherein the at least one processor is configured to allow access 1210 to the plurality of workflows stored in the plurality of workflow files to a select number of the plurality of computing devices via the network, wherein the at least one processor is configured to transmit 1220 one or more of the plurality of workflows to a select number of the plurality of computing devices, wherein the transmitted one or more plurality of workflows each generates at least one manifest, wherein the at least one manifest comprises a third-party interaction field, a credentials field, an input parameter field, and an output parameter field, wherein the at least one processor is configured to receive 1230 from a first computing device from the selected number of the plurality of computing devices a request for access to a shared workflow from the one or more plurality of workflows provided, wherein the at least one manifest of the shared workflow is configured to generate 1240 an acceptance requirement of the third-party interaction field, the credentials field, the input parameter field, and the output parameter field, wherein the acceptance requirement is required to be accepted by the first computing device in order to have access to the shared workflow, wherein the at least one processor is configured to deliver to the first computing device the at least one manifest of the shared workflow with the acceptance requirement in response to the request for access to the shared workflow, wherein the at least one processor is configured to receive from the first computing device consent 1250 of the acceptance requirement of the at least one manifest, and wherein the at least one processor is configured to enable access 1260 to the shared workflow for the first computing device in response to the received consent of the acceptance requirement of the at least one manifest.

Other embodiments may include combinations and sub-combinations of features described or shown in the several figures, including for example, embodiments that are equivalent to providing or applying a feature in a different order than in a described embodiment, extracting an individual feature from one embodiment and inserting such feature into another embodiment; removing one or more features from an embodiment; or both removing one or more features from an embodiment and adding one or more features extracted from one or more other embodiments, while providing the advantages of the features incorporated in such combinations and sub-combinations. As used in this paragraph, "feature" or "features" can refer to structures and/or functions of an apparatus, article of manufacture or system, and/or the steps, acts, or modalities of a method.

References throughout this specification to "one embodiment," "an embodiment," "an example embodiment," etc., indicate that the embodiment described may include a particular feature, structure, or characteristic, but every embodiment may not necessarily include that particular feature, structure, or characteristic. Moreover, such phrases are not necessarily referring to the same embodiment. Further, when a particular feature, structure, or characteristic is described in connection with one embodiment, it will be within the knowledge of one skilled in the art to affect such feature, structure, or characteristic in connection with other embodiments whether or not explicitly described.

Unless the context clearly indicates otherwise (1) the word "and" indicates the conjunctive; (2) the word "or" indicates the disjunctive; (3) when the article is phrased in the disjunctive, followed by the words "or both," both the conjunctive and disjunctive are intended; and (4) the word "and" or "or" between the last two items in a series applies to the entire series.

Where a group is expressed using the term "one or more" followed by a plural noun, any further use of that noun to refer to one or more members of the group shall indicate both the singular and the plural form of the noun. For example, a group expressed as having "one or more members" followed by a reference to "the members" of the group shall mean "the member" if there is only one member of the group.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

What is claimed is:

1. A system for sharing a workflow with a manifest comprising:
    a plurality of computing devices interconnected via a network;
    a workflow server, wherein the workflow server is configured to store a plurality of workflows in a plurality of workflow files;
    wherein the workflow server comprises at least one processor, wherein the at least one processor communicates to the plurality of computed devices via the network, and wherein the at least one processor further provides access to the plurality of workflows stored in the plurality of workflow files to a select number of the plurality of computing devices via the network;
    wherein the at least one processor transmits one or more of the plurality of workflows to the selected number of the plurality of computing devices;
    wherein, by the at least one processor, the transmitted one or more plurality of workflows configures and generates at least one manifest;
    wherein, by the at least one processor, the at least one generated manifest comprises an agreement for accessing one or more data from the selected number of the plurality of computing devices, and wherein the at least one generated manifest further comprises user-configuration requirements, wherein the user-configuration requirements comprises at least one of a third-party interaction field, a credentials field, an input parameter field, an output parameter field, or combinations thereof;
    wherein the at least one processor receives from a first computing device from the selected number of the plurality of computing devices, a request for access to a shared workflow from the one or more plurality of workflows provided;
    wherein, by the at least one processor and based on the received request from the first computer device for access to the shared workflow, the at least one generated manifest of the shared workflow generates an acceptance requirement of the agreement and of the at least one of the third-party interaction field, the credentials field, the input parameter field, the output parameter field, or combinations thereof;
    wherein the at least one processor requires consent of the acceptance requirement by the first computing device in order to have access to the shared workflow;
    wherein the at least one processor delivers to the first computing device the at least one generated manifest of the shared workflow with the acceptance requirement in response to the request for access to the shared workflow;
    wherein the at least one processor receives from the first computing device, consent of the acceptance requirement of the at least one generated manifest; and
    wherein the at least one processor enables access to the shared workflow for the first computing device in response to the received consent of the acceptance requirement of the at least one generated manifest.

2. The system of claim 1, wherein the at least one processor receives a plurality of inputs from the plurality of computing devices, wherein the plurality of inputs comprises populating a field of the at least one generated manifest.

3. The system of claim 1, wherein the third-party interaction field comprises third-party interaction data, wherein the third-party interaction data comprises at least one of a list of all third-party services that will be accessed by the shared workflow, an action call to be performed by a third-party service, access type of data to be accessed by the shared workflow, access type of the third-party service, or combinations thereof; wherein the at least one processor interacts with a third-party server according to the third-party interaction data.

4. The system of claim 3, wherein the list of all credentials required comprises at least one of credentials required by the list of all third-party services in the third-party interaction field, credentials inputted by a user, or combinations thereof.

5. The system of claim 1, wherein the credentials field comprises credentials data, wherein, by the processor, the credentials data generates a list of all credentials required to access the third-party services that will be accessed by the shared workflow, wherein one or more of the required credentials is defined as mandatory, default, or a combination of mandatory and default;
    wherein the at least one processor requests the credentials data according to the list of all credentials required.

6. The system of claim 1, wherein the input parameter field comprises input data, wherein the input data describes input types the shared workflow can accept;
    wherein the output parameter field comprises output data, wherein the output data describes output types the shared workflow will return upon execution of the shared workflow and that will be retrieved upon execution of the shared workflow;
    wherein the at least one processor accepts input types according to the input data; and wherein the at least one processor generates output types and retrieve output types according to the output data.

7. The system of claim 1, wherein the at least one generated manifest further comprises an access key, wherein, by the at least one processor, the access key enables access to the shared workflow within a first user tenant by the plurality of computing devices; wherein the access key comprises at least one of identification rights, credentials, identifying forms, and combinations thereof;
    wherein the at least one processor generates access to the shared workflow within the first user tenant to the plurality of computing devices in response to the access key.

8. The system of claim 1, wherein the at least one generated manifest further comprises at least one of a visibility field, a synchronicity field, a sharing type field, or combinations thereof.

9. The system of claim 1, wherein, by the at least one processor, the shared workflow generates a call to one or more additional workflows, wherein, by the at least one processor, a single manifest aggregates requirements of the shared workflow and requirements of the one or more additional workflows called by the shared workflow.

10. The system of claim 1, wherein one or more fields of a first manifest of the shared workflow comprise different fields in comparison to one or more fields of a second manifest of the shared workflow.

11. The system of claim 1, wherein transmitting the shared workflow comprises publishing the shared workflow to an access medium, wherein the published shared workflow and the at least one generated manifest is viewable by one or more users prior to the consent of the acceptance requirement of the at least one generated manifest, wherein the access medium may comprise at least one of the first user tenant, a second user tenant, a public platform, a private platform, or combinations thereof.

12. A system comprising: one or more processors; non-transitory computer-readable memory operatively connected to the one or more processors, the non-transitory computer-readable memory having stored thereon machine-readable instructions that, when executed by the one or processors, cause the one or more processors to perform a method comprising:

Communicating to a plurality of computing devices via a network;

allowing access, by the one or more processors, to a plurality of workflows stored in a plurality of workflow files to a select number of the plurality of computing devices via the network, wherein the plurality of workflow files is stored in a workflow server;

transmitting, by the one or more processors, one or more of the plurality of workflows to a select number of the plurality of computing devices, wherein the transmitted one or more plurality of workflows configures and generates at least one manifest, wherein the at least one generated manifest comprises an agreement for accessing one or more data from the selected number of the plurality of computing devices, and wherein the at least one generated manifest further comprises user-configuration requirements, wherein the user-configuration requirements comprises at least one of a third-party interaction field, a credentials field, an input parameter field, an output parameter field, or combinations thereof;

receiving, by the one or more processors, from a first computing device from the selected number of the plurality of computing devices a request for access to a shared workflow from the one or more plurality of workflows provided;

generating, by the one or more processors and based on the received request from the first computer device for access to the shared workflow, an acceptance requirement of the agreement and of the at least one the third-party interaction field, the credentials field, the input parameter field, the output parameter field, or combinations thereof;

wherein the at least one processor requires consent of the acceptance requirement by the first computing device in order to have access to the shared workflow;

delivering, by the one or more processors, to the first computing device the at least one generated manifest of the shared workflow with the acceptance requirement in response to the request for access to the shared workflow;

receiving, by the one or more processors, from the first computing device consent of the acceptance requirement of the at least one generated manifest; and enabling access, by the one or more processors, to the shared workflow for the first computing device in response to the received consent of the acceptance requirement of the at least one generated manifest.

13. The system of claim 12, wherein the method further comprises the at least one processor receiving a plurality of inputs from the plurality of computing devices, wherein the plurality of inputs comprises populating a field of the at least one generated manifest.

14. The system of claim 12, wherein the third-party interaction field comprises third-party interaction data, wherein the third-party interaction data comprises at least one of a list of all third-party services that will be accessed by the shared workflow, an action call to be performed by a third-party service, access type of data to be accessed by the shared workflow, access type of the third-party service, or combinations thereof; wherein the at least one processor further interacts with a third-party server according to the third-party interaction data.

15. The system of claim 12, wherein the credentials field comprises credentials data, wherein the credentials data, by the at least one processor, generates a list of all credentials required to access the third-party services that will be accessed by the shared workflow, wherein one or more of the required credentials is defined as mandatory, default, or a combination of mandatory and default;

wherein the at least one processor further requests the credentials data according to the list of all credentials required.

16. The system of claim 15, wherein the list of all credentials required comprises at least one of credentials required by the list of all third-party services in the third-party interaction field, credentials inputted by a user, or combinations thereof.

17. The system of claim 12, wherein the input parameter field comprises input data, wherein the input data describes input types the shared workflow can accept;

wherein the output parameter field comprises output data, wherein the output data describes output types the shared workflow will return upon execution of the shared workflow and that will be retrieved upon execution of the shared workflow;

wherein the method further comprises accepting input types according to the input data; and wherein the at least one processor further generates output types and retrieving output types according to the output data.

18. The system of claim 12, wherein the at least one generated manifest further comprises an access key, wherein, by the at least one processor, the access key enables access to the shared workflow within a first user tenant by the plurality of computing devices; wherein the access key comprises at least one of identification rights, credentials, identifying forms, and combinations thereof;

wherein the at least one processor further generates access to the shared workflow within the first user tenant to the plurality of computing devices in response to the access key.

19. The system of claim 12, wherein the at least one generated manifest further comprises at least one of a visibility field, a synchronicity field, a sharing type field, or combinations thereof.

20. The system of claim 12, wherein, by the at least one processor, the shared workflow generates a call to one or more additional workflows, wherein a single manifest aggregates requirements of the shared workflow and requirements of the one or more additional workflows called by the shared workflow.

21. The system of claim 12, wherein one or more fields of a first manifest of the shared workflow comprise different fields in comparison to one or more fields of a second manifest of the shared workflow.

22. The system of claim 12, wherein transmitting the shared workflow comprises publishing the shared workflow to an access medium, wherein the published shared workflow and the at least one generated manifest is viewable by one or more users prior to the consent of the acceptance requirement of the at least one generated manifest, wherein the access medium may comprise at least one of the first user tenant, a second user tenant, a public platform, a private platform, or combinations thereof.

23. A method for sharing a workflow with a manifest, comprising a plurality of computing devices interconnected via a network, a workflow server, wherein the workflow server is configured to store a plurality of workflows in a plurality of workflow files, wherein the workflow server comprises at least one processor, the method comprising:

communicating, by the at least one processor, the plurality of computing devices;

allowing access, by the at least one processor, to the plurality of workflows stored in the plurality of workflow files to a select number of the plurality of computing devices via the network, wherein the plurality of workflow files is stored in the workflow server;

transmitting, by the at least one processor, one or more of the plurality of workflows to a select number of the plurality of computing devices, wherein the transmitted one or more plurality of workflows configures and generates at least one manifest, wherein the at least one generated manifest comprises an agreement for accessing one or more data from the selected number of the plurality of computing devices, and wherein the at least one generated manifest further comprises user-configuration requirements, wherein the user-configuration requirements comprises at least one of a third-party interaction field, a credentials field, an input parameter field, an output parameter field, or combinations thereof;

receiving, by the at least one processor, from a first computing device from the selected number of the plurality of computing devices a request for access to a shared workflow from the one or more plurality of workflows provided;

generating, by the at least one processor, an acceptance requirement of the agreement and of the at least one of the third-party interaction field, the credentials field, the input parameter field, the output parameter field, or combinations thereof, wherein the at least one processor requires consent of the acceptance requirement by the first computing device in order to have access to the shared workflow;

delivering, by the at least one processor, to the first computing device the at least one generated manifest of the shared workflow with the acceptance requirement in response to the request for access to the shared workflow;

receiving, by the at least one processor, from the first computing device consent of the acceptance requirement of the at least one generated manifest; and enabling access, by the at least one processor, to the shared workflow for the first computing device in response to the received consent of the acceptance requirement of the at least one generated manifest.

24. The method of claim 23, wherein the third-party interaction field comprises third-party interaction data, wherein the third-party interaction data comprises at least one of a list of all third-party services that will be accessed by the shared workflow, an action call to be performed by a third-party service, access type of data to be accessed by the shared workflow, access type of the third-party service, or combinations thereof; wherein the at least one processor further interacts with a third-party server according to the third-party interaction data.

25. The method of claim 23, wherein the credentials field comprises credentials data, wherein, by the at least one processor, the credentials data generates a list of all credentials required to access the third-party services that will be accessed by the shared workflow, wherein one or more of the required credentials is defined as mandatory, default, or a combination of mandatory and default;

wherein the at least one processor further requests the credentials data according to the list of all credentials required, wherein the list of all credentials required comprises at least one of credentials required by the list of all third-party services in the third-party interaction field, credentials inputted by a user, or combinations thereof.

26. The method of claim 23, wherein the input parameter field comprises input data, wherein the input data describes input types the shared workflow can accept; wherein the output parameter field comprises output data, wherein the output data describes output types the shared workflow will return upon execution of the shared workflow and that will be retrieved upon execution of the shared workflow;

wherein the at least one processor further accepts input types according to the input data; and wherein the at least one processor further generates output types and retrieving output types according to the output data.

27. The method of claim 23, wherein the at least one generated manifest further comprises an access key, wherein, by the at least one processor, the access key enables access to the shared workflow within a first user tenant by the plurality of computing devices; wherein the access key comprises at least one of identification rights, credentials, identifying forms, and combinations thereof;

wherein the at least one processor further generates access to the shared workflow within the first user tenant to the plurality of computing devices in response to the access key.

28. The method of claim 23, wherein the at least one generated manifest further comprises at least one of a visibility field, a synchronicity field, a sharing type field, or combinations thereof.

29. The method of claim 23, wherein, by the at least one processor, the shared workflow generates a call to one or more additional workflows, wherein, by the at least one processor, a single manifest aggregates requirements of the shared workflow and requirements of the one or more additional workflows called by the shared workflow.

30. The method of claim 23, wherein one or more fields of a first manifest of the shared workflow comprise different fields in comparison to one or more fields of a second manifest of the shared workflow.

31. The method of claim 23, wherein transmitting the shared workflow comprises publishing the shared workflow to an access medium, wherein the published shared workflow and the at least one generated manifest is viewable by one or more users prior to the consent of the acceptance requirement of the at least one generated manifest, wherein the access medium may comprise at least one of the first user tenant, a second user tenant, a public platform, a private platform, or combinations thereof.

* * * * *